May 15, 1962 L. J. LADER ETAL 3,035,263
DIGITAL RANGE TRACKING CIRCUIT
Filed Jan. 22, 1958 3 Sheets-Sheet 1

INVENTORS.
LEON J. LADER,
WILLIAM H. PROUD,
BY
Edwin A. Oser.
ATTORNEY.

May 15, 1962 L. J. LADER ETAL 3,035,263
DIGITAL RANGE TRACKING CIRCUIT
Filed Jan. 22, 1958 3 Sheets-Sheet 2

INVENTORS.
LEON J. LADER,
WILLIAM H. PROUD,
BY
ATTORNEY.

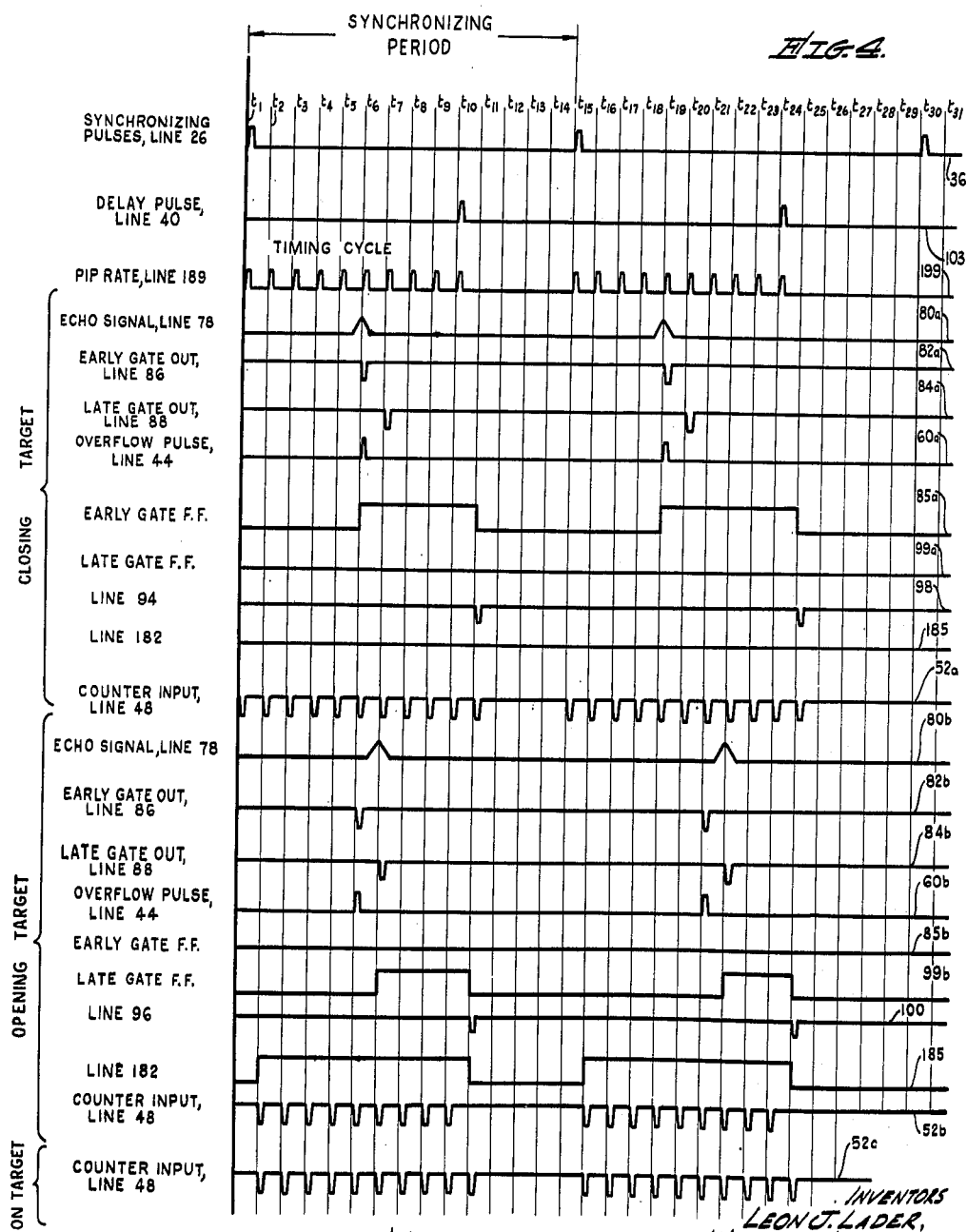

United States Patent Office 3,035,263
Patented May 15, 1962

3,035,263
DIGITAL RANGE TRACKING CIRCUIT
Leon J. Lader, Los Angeles, and William H. Proud, Culver City, Calif., assignors to Hughes Aircraft Company, Culver City, Calif., a corporation of Delaware
Filed Jan. 22, 1958, Ser. No. 710,583
13 Claims. (Cl. 343—7.3)

This invention relates to range tracking circuits for radar receivers and more particularly to an improved digital range tracking circuit utilizing a recycling counter for range indication.

In conventional analogue range tracking circuits, a tracking sweep generator acts to form a sweep voltage signal which is compared in a coincidence circuit with a voltage representing the time of receipt of an echo signal from the particular target or object in space being tracked. In response to the comparison, an error signal is then formed and passed to the coincidence circuit which acts to modify the voltage at which a coincidence occurs by changing the reference level of the sweep voltage.

The value of the sweep voltage at coincidence is the voltage representing calibrated range. This conventional arrangement has the disadvantage of poor accuracy since range accuracy is a function of range, decreasing with a greater range because of the nonlinearity of the sweep voltage. Also poor accuracy results because of poor zero setting stability, i.e., the voltage representing calibrated range varies because of changing characteristics of the components utilized in the system, and also results because the voltage representing calibrated range varies when stored, due to leakage.

Digital range tracking circuits have the advantage of a fixed range accuracy for both close and distant targets because the accuracy of the time of coincidence is not determined by the linearity of a sweep voltage but is determined by output signals occurring at fixed digital counts. Also other sources of error such as zero setting stability and variations because of leakage of the stored voltage representing range are eliminated. Digital range tracking circuits may comprise a counter controlled by a pulse generator responding to a transmitter synchronizing pulse. An output signal of the counter may control an early and late gating arrangement which, in response to an echo signal, passes a signal to a count modifying circuit to vary the contents of the counter to conform to range. The count modifying circuit requires storage of the counter contents and requires means to add or to subtract from the contents of the counter so as to come into coincidence with both early and late gating signals. This arrangement has the disadvantage of complexity because the count modifying circuit requires storage and requires means for both addition and subtraction for increasing or decreasing the contents of the counter.

Accordingly, it is an object of this invention to provide an improved simplified digital range tracking circuit which requires a minimum number of components for automatic range tracking.

Yet another object of this invention is to provide a digital range tracking circuit which has simplicity and a high degree of accuracy by utilizing a recycling binary counter with its contents indicating range, and which forms a range gate signal at a fixed count value of the cycle to correct its contents.

It is a further object of this invention to provide a simplified and accurate digital range tracking circuit utilizing a recycling counter, which does not require addition or subtraction from the count stored in the counter, but only modification of a fixed number of pulses passed into the counter.

It is a further object of this invention to provide a digital range tracking circuit which has a high degree of accuracy by utilizing a pulse generator which responds to a signal from a delay line used as a time base.

According to one feature of this invention the binary contents of a recycling counter which counts in response to counter input pulses is utilized to indicate range. The counter also forms an overflow pulse at a count to indicate completion of a cycle or at an overflow count which is utilized with an echo signal for changing its contents to conform to the range of a target or object in space being tracked. A timing pulse generator connected as an input to the counter responds to time base or synchronizing pulses defining a synchronizing period, to generate a train of counter input pulses, at the beginning of each synchronizing period. The train of pulses is equal in number to one complete count cycle of the counter. The binary contents of the counter are changed by adding counter input pulses or by cancelling the counter input pulses of the pulse train, thus varying the time of occurrence of the overflow pulse. The overflow pulse passes to a range gate generator to form a range gate signal which passes to early gate and late gate circuits. The early gate and late gate circuits in response to a time coincidence of the echo signal and the overflow pulse form early gate and late gate signals which are stored in an early gate and a late gate flip-flop respectively. When tracking a closing target, a counter input pulse from the early gate flip-flop passes, at the end of each pulse train, to the counter causing one additional count to take place during the following synchronizing period. When tracking an opening target, an output signal from the late gate flip-flop passes at the end of each pulse train to a pulse cancellation circuit to cancel the first counter input pulse of the pulse train during the following synchronizing period. Thus the time of formation of the overflow pulse changes as the range of the target or object being tracked varies.

The novel features of this invention, as well as the invention itself, both as to its organization and method of operation, will best be understood from the accompanying description, taken in connection with the accompanying drawing, in which like reference numerals refer to like parts, and in which:

FIG. 4 is a schematic diagram of waveforms for explaining the operation of this invention.

Figure 1:
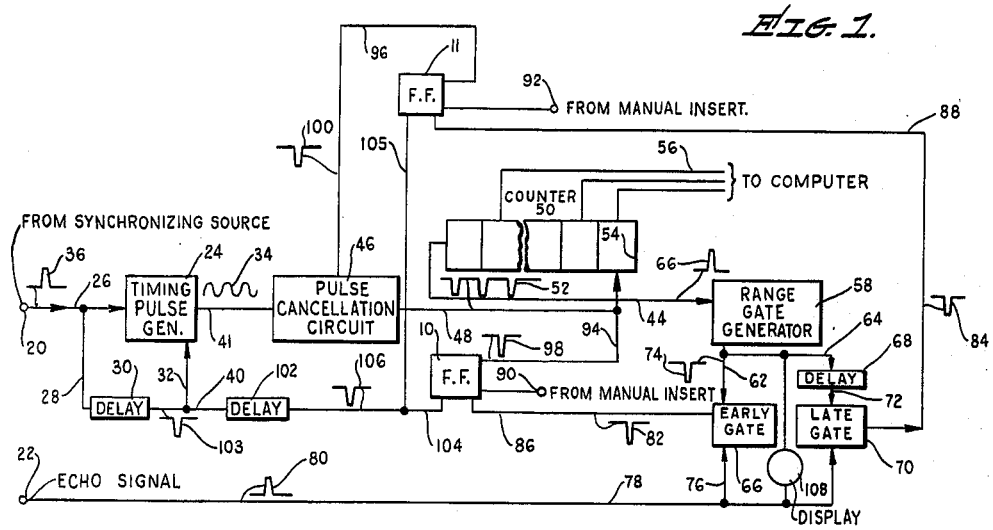
FIG. 1 is a block diagram of a digital range tracking circuit in accordance with this invention which includes an early gate flip-flop, a pulse cancellation circuit and a counter.

Referring first to FIG. 1, a block diagram of the digital range tracking circuit of this invention is shown. A terminal 20 is connected as an input to a timing pulse generator 24 through a line 26 and is also connected as an input to a delay line 30 through a line 28 connected from the line 26. Line 40 which is the output of the delay line 30 is connected to the timing pulse generator 24 through a line 32. The timing pulse generator 24 as well known in the art, forms a train of pulses as shown by a waveform 34 on a line 41 in respone to a synchronizing pulse as shown by a waveform 36. The synchronizing pulse of the waveform 36 also passes through the delay line 30 to form a pulse of a waveform 103 and terminate the train of pulses as shown by the waveform 34, after a fixed number of pulses, as will be explained subsequently. The line 41 connects to a pulse cancellation circuit 46 which in turn connects through a line 48 to the input of a counter 50. The train of pulses as shown by the waveform 34 are passed into the pulse cancellation circuit 46 to form the train of counter input pulses as shown by a waveform 52 on the line 48. The counter 50 which counts binarily in response to the counter input pulses of waveform 52 supplied to its first binary is a recycling or repetitive counter, i.e., after counting binarily through a cycle to its maximum count value, continues counting in response to counter input pulses through its minimum count value and back through the count cycle. The counter 50 may comprise a plurality of flip-flops as 54 with diode logic controlling the state of the flip-flops 54 in response to input counter pulses of the waveform 52 applied to the first binary flip-flop 54. The binary states of the contents of the counter 50 indicating the range, appear on lines 56, for example, and pass to a computer (not shown) or other associated system to be utilized. A line 44 which is connected from the output of the counter 50, which is from the last binary stage of the counter 50 to a range gate generator 58 carries an overflow pulse as shown by a waveform 60, that occurs when the counter 50 reaches its maximum count. The range gate generator 58 is connected to an early gate 66 by a line 62 and is connected to a delay line 68 by a line 64 which is connected from the line 62. Delay line 68 is connected to a late gate 70 by a line 72. A line 78 also connects as an input to late gate 70 and a line 76, which connects from the line 78, also connects as an input to the early gate 66. The line 78 connects from terminal 22 which receives an echo signal as shown by a waveform 80 from radar receiver circuitry (not shown) receiving a reflected signal from a target. It is to be noted that the target may be any object in space. As well known to the art, the early gate 66 forms an early gate signal as shown by a waveform 82 when a range gate signal of a waveform 74 coincides in time with the echo signal of the waveform 80. Also the late gate 70 forms the late gate signal as shown by a waveform 84 in response to a coincidence of a delayed range gate signal of the waveform 74 and the echo signal of the waveform 80.

The output of the early gate 66 is connected through a line 86 as an input to an early gate flip-flop 10 and the output of the late gate 70 is connected through a line 88 as an input to a late gate flip-flop 11. The early gate flip-flop 10 also has an input from a terminal 90 and the late gate flip-flop 11 also has an input from a terminal 92, the two inputs providing manual control of the counter for locking on the target, as will be explained subsequently.

The output of the early gate flip-flop 10 is connected by a line 94 as an input to the counter 50 to add a counter input pulse as shown by a waveform 98 to the counter 50. The output of the late gate flip-flop 11 is connected by a line 96 as an input to the pulse cancellation circuit 46 to store a pulse as shown by a waveform 100 in the pulse cancellation circuit 46. The pulse cancellation circuit 46 acts to cancel the first pulse of the waveform 52.

In order to reset the flip-flops 10 and 11 to form the output pulse of the waveforms 98 and 100, respectively, a delay line 102 is connected to line 40. The output of the delay line 102 is connected to the flip-flops 10 and 11 by lines 104 and 105, respectively, to pass a reset pulse of a waveform 106 to the flip-flops at the end of the train of pulses of waveform 52 as formed from the pulses of waveform 34, as will be explained subsequently. A display means 108 is connected between the line 64 and the line 78 to provide a visual display for manually locking the contents of the counter 50 on the target as will also be explained. Thus the contents of the counter 50 which indicate range is varied with a moving target by adding and by cancelling counter input pulses passed into the counter 50 so as to maintain the time of formation of the overflow pulse of the waveform 60 coincident in time with the target echo signal of the waveform 80.

Figure 2:
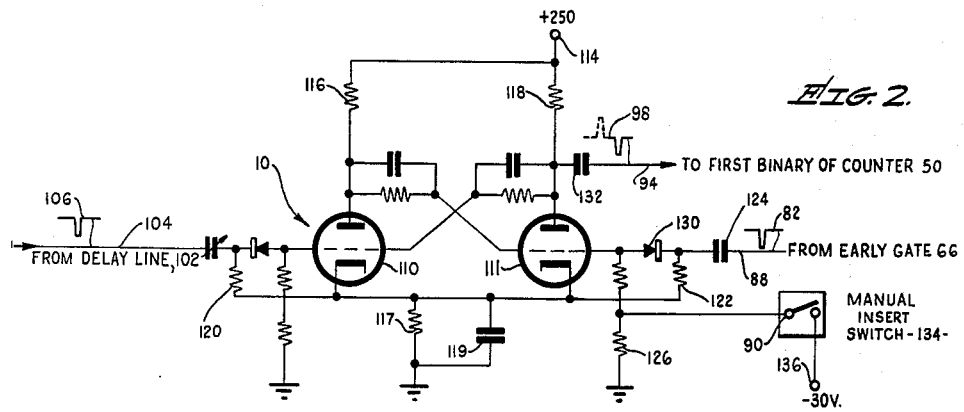
FIG. 2 is a schematic diagram of the early gate flip-flop of FIG. 1.

Referring now to FIG. 2, a schematic diagram is shown of early gate flip-flop 10 of FIG. 1. The flip-flop 10 comprises tubes 110 and 111 with their anodes connected from +250 volt terminal 114 by way of load resistors 116 and 118, and with their cathodes connected to their grids by way of decoupling resistors 120 and 122, respectively, which back bias diode 130, for example. The cathodes of the tubes 110 and 111 are also connected to ground potential by way of a biasing resistor 117 and a filter capacitor 119. The input line 86 from the early gate 66 is connected to the grid of the tube 111 by way of a coupling capacitor 124 and the diode 130. The diode 130 is connected to limit the positive swing of the potential on the grid of the tube 111. Resistors 126 and 128 comprise part of the divider circuit of the flip-flop 10. The plate of the tube 111 is connected to an output line 94 by way of a differentiating capacitor 132 to form a positive pulse when the tube 111 is biased out of conduction and a negative pulse when the tube 111 is biased into conduction as shown by the waveform 98, which pulses pass to the first binary input of the conuter 50. In a similar manner, the input line 104 is connected to the grid of tube 110. Since flip-flop 10 is a version of the Eccles-Jordan type, it will not be explained in further detail.

In operation the tube 111 is normally conducting because the flip-flop 10 was reset by the negative pulse of the waveform 106 appearing on the line 104 to cut off the tube 110. Upon the appearance of the negative early gate signal of the waveform 82 appearing on the line 86 the tube 111 is triggered out of conduction causing the potential on the line 94 to rise toward the +250 volts of the terminal 114. The positive pulse of the waveform 98 is formed but does not affect the counter 50 (FIG. 1) as will be explained subsequently. At the same time, the tube 110 is triggered into conduction. Then, upon the occurrence of the reset pulse of the waveform 106 on the line 104 at the end of the train of pulses of waveform 52 (FIG. 1), tube 110 is biased out of conduction causing tube 111 to again conduct and the potential at the plate to fall toward the cathode potential. This fall of potential is differentiated by the action of the capacitor 132 to form the negative counter input pulse of the waveform 98, which causes the counter 50 to count once by adding a pulse to the train of pulses of the waveform 52 (FIG. 1).

For manually inserting the counter pulses of waveform 98 into the counter 50, manual insert switch 134 is provided, connected between the terminal 90 and the —30 volt terminal 136. The terminal 90 is connected between resistors 126 and 128 of the divider circuit of the flip-flop 10. Closing the switch 134 biases the tube 111 out of its conducting state, which is maintained during the reset condition of the flip-flop 10, causing tube 110 to conduct. Thus, upon the occurrence of the reset pulse of the waveform 106 upon the line 104, the tube 110 is biased out of conduction to cause the tube 111 to conduct again and to cause the negative counter input pulse of the waveform 98 to be formed. As will be explained subsequently, this action occurs in each synchronizing pulse period, thus rapidly bringing the counter 50 onto the target. It is to be noted that the late gate flip-flop 11 (FIG. 1) acts in a similar manner to the early gate flip-flop 10, therefore it will not be explained in detail.

Figure 3:
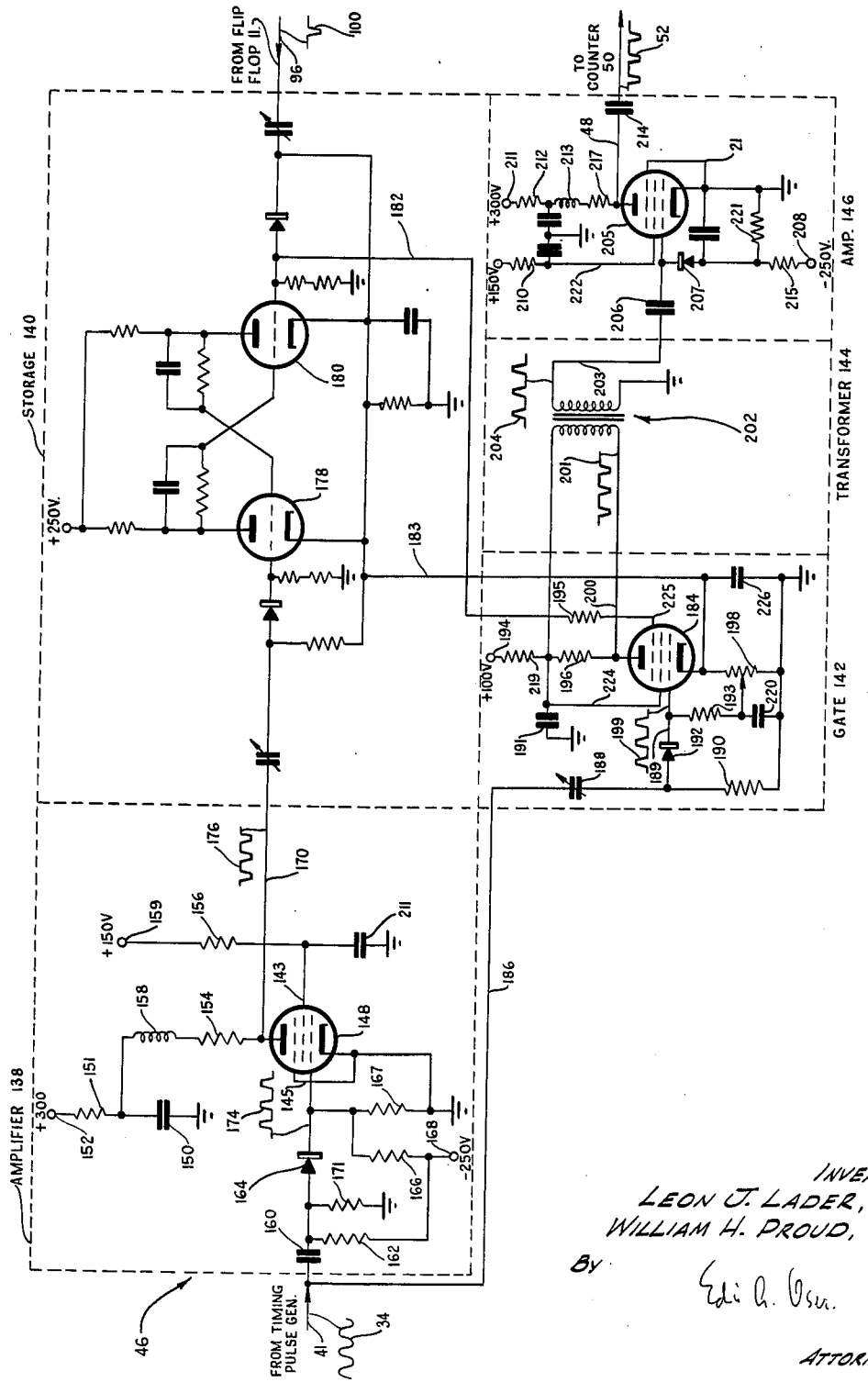
FIG. 3 is a schematic diagram of the pulse cancellation circuit of FIG. 1.

Referring now to FIG. 3, a schematic diagram is shown of the pulse cancellation circuit 46 of FIG. 1. The pulse train of the waveform 34 is received on the line 41 by an amplifier circuit 138 which comprises an amplifier tube 148. The amplifier tube 148, which is a pentode, has its anode connected to +300 volt terminal 152 by way of a load resistor 154, an inductor 158 utilized as a peaking coil for improving the rise time of the output pulse, and by way of a resistor 151. An A.C. by-pass to ground is also provided by a filter capacitor 150. Screen grid 143 is connected to a +150 volt terminal 159 by way of a resistor 156 and is connected to ground by a filter capacitor 211. The suppressor grid 145 and the cathode of the tube 148 are connected to ground potential. The line 41 is connected by way of coupling capacitor 160 and a rectifying diode 164 to the control grid of the tube 148.

The anode of the diode 164 is connected to the —250 volt terminal 168 by way of a resistor 162 which provides a bias voltage in combination with a resistor 171 for the diode 164. Resistors 166 and 167 are connected between ground potential and the —250 volt terminal 168 to provide a D.C. bias for the control grid of tube 148 which is maintained in a nonconducting state except in response to positive pulse of a waveform 174. An output line 170 is connected to the anode of the tube 148. Thus the pulse train of waveform 34 is rectified as shown by the waveform 174 and is amplified and inverted in the tube 148 to appear on the line 170 as shown by a wave form 176.

The line 170 connects to a storage circuit 140 which includes a flip-flop comprising tubes 178 and 180. This flip-flop of storage circuit 140 is similar to the flip-flop 10 of FIG. 2 and will not be explained in detail. The line 170 connects to the grid of the tube 178 and the line 96 from the flip-flop 11 connects to the rod of tube 180 in a similar manner to the input of the flip-flop 10, as explained. One output of the storage circuit 140 is a line 182 which connects from the grid of the tube 180 to the suppressor grid of a gating tube 184 of a gating circuit 142, as will be explained. Another output is a line 183 which provides a cathode bias for the gating tube 184, as will also be explained subsequently.

In operation, tube 180 is normally conducting in response to the negative pulses of the waveform 176 biasing the tube 178 out of conduction. Thus the potential on line 182 is normally maintained at a high potential relative to the line 183 to maintain the gate circuit 142 open to pass pulses, as will be explained. However, at the end of the train of pulses of the waveform 34, when a pulse of the waveform 100 is received on the line 96 from late gate flip-flop 11 (FIG. 1) to cancel the next pulse passed through the pulse cancellation circuit 46, the tube 180 is biased out of conduction causing the tube 178 to conduct. Thus the potential on line 182 follows the grid of tube 180 and falls to a low potential to close the gate of the gate circuit 142. Then upon the occurrence of the first pulse of the waveform 176, during the following synchronizing pulse period, as will be explained, the tube 178 is biased out of conduction causing the tube 180 to again conduct. Thus the potential on the line 182 rises to allow the gate circuit 142 to pass further pulses of the waveform 34. Therefore, the storage circuit 140 stores a pulse of the waveform 100 from the late gate flip-flop 11 to gate out only the first pulse of the waveform 34 in the gate circuit 142.

The gate circuit 142 which comprises a pentode tube 184 will now be explained in detail. A line 186 connects from the line 41 to the control grid of the tube 184 by way of a coupling capacitor 188, a rectifying diode 192 and a line 189. A resistor 190 provides a D.C. return for the diode 192 and a resistor 193 provides a bias for the control grid. A capacitor 220 is connected to provide an A.C. by-pass to ground potential. The anode of the tube 184 is connected to a +150 volt terminal 194 by way of load resistor 196 in parallel with a pulse transformer 202 and by way of a filter arrangement. The cathode is connected to ground potential by way of biasing resistor 198. The cathode of tube 184 is also connected through line 183 to the cathodes of tubes 178 and 180 to provide a bias in relation to the gating signal appearing on line 182. A capacitor 226 is connected to line 183 to provide an A.C. by-pass to ground potential. A screen grid 224 of tube 184 is biased by being connected to ground potential by way of filter capacitor 191 and to the +150 volt terminal 194 by way of resistor 219. A suppressor grid 225 is connected to the line 182 by way of resistor 195 which provides a delay of the input signal.

In operation, when the suppressor grid 225 has a signal of a high potential impressed upon it, the pulse train of waveform 34 is passed through rectifying diode 192 to form the pulses of the waveform 199, and appears on line 200 as the train of pulses of waveform 201. The tube 184 is normally non-conducting except upon the occurrence of a pulse of waveform 199, which biases it into conduction. When the suppressor grid 225 has a signal upon it of a low potential from the line 182, a pulse of waveform 34 is prevented from passing through the tube 184 since current is passed to the screen grid 224 rather than to the anode. Thus the line 200 remains at its high potential as determined by the terminal 194.

The line 200 connects to the inverting transformer 202 of a transformer circuit 144 where the pulses of the waveform 201 are inverted to appear on a line 203 as shown by a waveform 204.

The line 203 connects to the control grid of pentode tube 205 of an amplifier circuit 146 by way of a coupling capacitor 206. The control grid of the tube 205 is clamped through diode 207 which is connected through resistors 215 and 221 to the —250 volt terminal 208 and to ground potential respectively, to limit the negative potential on the control grid. The cathode of tube 205 is connected to ground potential. A screen grid 222 is connected to the +150 volt terminal 209 by way of a filter resistor 210 and a suppressor grid 216 is connected to ground potential.

The plate of the tube 205 is connected to a +300 volt terminal 211 by way of a load resistor 217, an inductor 213 used as a peaking coil to improve the rise time of the output signal, and a filter resistor 212. The line 48 connects by way of coupling capacitor 214 from the plate of the tube 205 to the first binary stage of the counter 50 (FIG. 1) to cause the counter to count, as was explained. Thus the pulses of the waveform 204 are amplified and inverted in the amplifier circuit 146 to appear on the line 48 as the waveform 52. Therefore the pulse cancellation circuit 46 acts in response to a pulse of the waveform 100 on the line 96 to cancel the first counter input pulse of the pulses of the waveform 34.

Referring now to FIG. 4 which is a schematic diagram to explain the operation of the digital range tracking circuit, and referring back to FIG. 1, the timing of this invention will be explained in greater detail. Synchronizing pulses of waveform 36 on line 26 as shown by waveform 36 define the synchronizing pulse period or transmitter interpulse period from times $t_1$ to $t_{15}$. Upon the appearance of a pulse of waveform 36 at time $t_1$ the pulse train of wave form 34 (FIG. 1) is formed to pass into gate circuit 142 where it is rectified to form positive pulses of the waveform 199. The pip rate of these rectified pulses as shown by the waveform 199 which appears on the line 189 (FIG. 3) comprises ten negative pulses at times $t_1$ through $t_{10}$ as determined by the delay pulse on the line 40 of the waveform 103 which controls the timing pulse generator 24. It is to be noted that the pip rate of the waveform 199 as determined by the pulse train of the waveform 34 (FIG. 1) is shown with only 10 pulses for purposes of explanation while in actual practice 512 one-half microsecond pulses are used to comprise the pip rate on line 189.

The operation of the circuit when locked on a closing target i.e. when the echo signal from the closing target is maintained within the time of occurrence of the signal passed from the range gate generator 58 into the early gate 66 and the delayed signal on line 72 passed into the late gate 70, will first be explained. As the counter 50 counts from its setting, at time $t_1$ when locked on a target, in response to the pulses of the waveform 34 (FIG. 1) forming the counter input pulses of the waveform 52a, an overflow pulse as shown by the waveform 60a is formed at time $t_6$. Since the echo signal of the waveform 80a is also received at time $t_6$ there is a coincidence of pulses in the early gate 66. An early gate output as shown by the waveform 82a is passed to the early flip-flop 10 to trigger its output on the line 94 to a positive state as indicated by the waveform 85a, which is when the tube 111 (FIG. 2) is biased out of conduction. At time $t_{11}$, as the early gate flip-flop 10 is reset by the delayed pulse of waveform 106 (FIG. 1) on the line 104, a counter input pulse as shown by waveform 98 is differentiated and passed to the counter 50 on the line 94. Thus the input to the counter 50 comprises eleven negative counter input pulses of the waveform 52a since a counter input pulse at time $t_{11}$ is added to the pulse train of the waveform 52. Therefore at the end of the first synchronizing pulse period, the counter has advanced one binary count from its condition at the end of the previous period.

During a second synchronizing pulse period, between times $t_{15}$ to $t_{30}$ the closing target will for purposes of explanation have moved so as to form an echo signal of the waveform 80a at time $t_{19}$, which is one pulse time sooner than in the first synchronizing pulse period. The overflow pulse of waveform 60a also occurs at time $t_{19}$ because one pulse was added to waveform 52a during the first synchronizing pulse period to advance counter 50 one binary count. A coincidence of the echo signal of waveform 80a and the overflow pulse as shown by waveform 60a causes the same action as described during the first synchronizing pulse period. One counter pulse is added to the pulse train of waveform 52a. Thus a change of count by adding one counter pulse to the end of the pulse train of waveform 52a changes the time of occurrence of the overflow pulse of waveform 60a during the following synchronizing pulse period to cause the binary contents of the counter to follow a closing target.

The operation of the circuit when locked onto an opening target i.e., when the contents of the counter 50 are changing to follow a target or object moving away from the radar receiver as known in the art, will now be explained. As the pulse train of the waveform 52b passes into the counter 50 and causes it to count, an overflow pulse at the counter output as shown by the waveform 60b is formed at time $t_6$. The overflow pulse occurs at time $t_6$ as determined by the contents of the counter 50, which thus occurs at the same time as in the example for a closing object in space. The overflow pulse of waveform 60b when delayed one pulse time in delay line 68 coincides at time $t_7$ with the echo signal of the waveform 80b. Thus at time $t_7$ a late gate output signal as shown by waveform 84b is passed to the late gate flip-flop 10 to cause it to store the signal by changing to a state as indicated by a waveform 99b. The waveform 99b indicates that the tube 111 of flip-flop 10 of FIG. 2 which is in a similar arrangement to the early gate flip-flop 11, is in a nonconducting state. Then at time $t_{11}$ at the end of the pip train of the waveform 199, the late gate flip-flop 11 is reset, and the differentiated negative pulse of the waveform 100 is passed to the pulse cancellation circuit 46 to be stored in the storage circuit 140 (FIG. 3), as previously explained. The potential on line 182 as shown by waveform 185, thus falls to a low potential at time $t_{11}$ to prevent the first pulse of waveform 52b from passing through the control gate circuit 142 of FIG. 3 during the following synchronizing pulse period. It is to be noted that for an opening target no pulse of waveform 52 is passed to the counter 50 at time $t_{11}$ since the early gate flip-flop 10 is not storing a pulse.

During the second synchronizing pulse period between times $t_{15}$ to $t_{30}$ the first pulse of waveform 52b is gated or cancelled at time $t_{15}$ by the pulse cancellation circuit 46 so as to be prevented from passing into the counter 50. Thus the counter 50 starts its count one pulse time later than the first pulse of waveform 199, i.e., at time $t_{16}$ and an overflow pulse of waveform 60b is not formed until time $t_{21}$. Thus a coincidence in time of the delayed overflow pulse of waveform 60b and the echo pulse of waveform 80b at time $t_{22}$ is required one pulse time later than in the first synchronizing period. It is to be noted that the echo signal of waveform 80b is presumed to have moved one pulse period for purposes of explanation. Therefore when tracking an opening target, the first pulse of the pulse train of waveform 52b is cancelled during each synchronizing pulse period to form the overflow pulse of waveform 60b one pulse time later.

When the counter 50 is on a target as when the target being tracked is non-moving, the pulse of waveform 74 (FIG. 1) passed into the early gate 66 and the pulses passed into the late gate 70 both partly coincide in time with the echo signal of the waveform 80. Thus both addition and subtraction of counter pulses as shown by waveform 52c take place during each synchronizing pulse period. Both the early gate flip-flop 10 and the late gate flip-flop 11 receive pulses of waveforms 82 and 84 respectively, during each synchronizing pulse period. Therefore the binary contents of counter 50 remain at the same count from one synchronizing pulse period to another when the contents of the counter 50 are on target.

Thus when this circuit is tracking a closing target, a count is added to the contents of the counter during a first synchronizing period so the overflow count is formed one count time sooner in a second synchronizing period. Also when tracking an opening target a signal stored in the pulse cancellation circuit during a first synchronizing period cancels the first counter pulse during a second synchronizing period so the overflow count is formed one count time later when the circuit is locked on target, both of the above operations occur during each synchronizing period.

The binary output as on line 56 carrying the binary count in the counter 50 is passed to the computer between times $t_{11}$ and $t_{15}$ of each interpulse period to indicate range. It is to be noted that when tracking an opening target which subtracts the first pulse of the pulse train of waveform 52 the counter is not corrected until the following interpulse period. However, since a 2 mc. repetition frequency of counter pulses of waveform 52 may be used, this small error in range reading is negligible. Thus the counter 50 may have a count capacity of 512, forming 512 one-half microsecond pulses during each synchronizing pulse period which for convenience of explanation is shown as ten pulses from time $t_1$ to $t_{10}$. Thus the time between time $t_{10}$ and $t_{15}$ may be 244 microseconds.

This system using 2 mc. pip rate and using a 2 kc. radar synchronizing or pulse repetition frequency rate has been found to track at a target velocity of 8,000 knots with a 32 nautical mile range. It is to be noted that the accuracy and maximum target range, within the limits of the counter 50, are primarily determined by the pip rate and the maximum velocity of the target for which the system is capable of tracking is primarily determined by the synchronizing rate.

Figure 5:
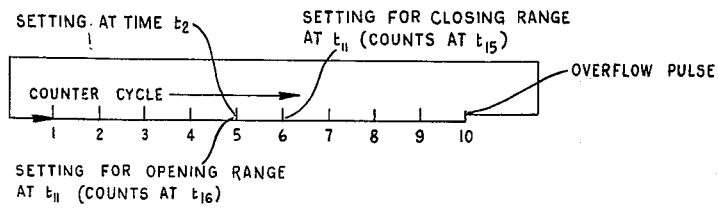
FIG. 5 is a schematic diagram of the counter cycle for explaining the operation of the counter.

Referring now to FIG. 5 which shows a schematic diagram of the counter cycle and also to FIG. 1 the operation of the counter 50 will be explained in further detail. As explained, the recycling counter 50 for purposes of explanation, counts to a total binary count capacity of 10 for each cycle, repeating its cycle in response to further inputs. It is to be noted that in actual practice where 512 one-half microsecond pulses may be formed by the timing pulse generator 24 of FIG. 1, the counter counts from 0 to 511 forming an overflow pulse at a count of 512. The counter 50 as indicated by the counter cycle in the diagram of FIG. 5 will be assumed to be tracking a target during a first synchronizing pulse period with a binary starting count of 5 at time $t_2$, for example. It is to be noted that the overflow pulse of waveform 60 to be compared with the echo pulse of waveform 80 is always formed when the counter 50 has reached a binary count of 10. For an approaching or closing target giving a closing range, one count is added during the first synchronizing pulse period at time $t_{11}$ so the counter 50 starts counting toward binary 10 one binary count later than indicated by the pip train of waveform 199 (FIG. 4) or at a binary count of 6 at the start of the second synchronizing pulse period at time $t_{15}$.

Thus the overflow pulse of waveform 60 (FIG. 1) is formed one counter input pulse time earlier because of the added count, or at time $t_{19}$ to coincide with the target echo signal of waveform 80, which occurs earlier in the second synchronizing pulse period for a closing range.

For an opening range, the binary starting count of 5 of the target range setting is maintained until time $t_{16}$ since the first counter input pulse passed to the counter 50 at the beginning of the second synchronizing pulse period at time $t_{15}$ is cancelled by pulse cancellation circuit 46. Thus the overflow pulse for the binary count value of 10 is formed at time $t_{21}$ which is one counter pulse time later than indicated by the pip train of waveform 199 (FIG. 4). The overflow pulse thus coincides with the target echo signal at time $t_{22}$, as in the example of FIG. 4, for an opening range.

It is to be noted that the echo signal in closing and opening targets in actual practice may only move to change the time of the echo pulse a portion of a period between counter pulses. Thus the operation of the circuit may be combinations of adding and cancelling counter pulses passed into the counter 50 during sequential synchronizing pulse periods.

Thus there has been described a circuit which responds to the time of occurence of a random echo signal and a synchronizing pulse to control a predetermined recycling counter to indicate range. The counter may be controlled by a train of counter input pulses during each synchronizing period. The train of counter input pulses are formed so as to cause the counter to count one complete cycle. An overflow pulse is also formed at the overflow count of the cycle for passing into an early gate and late gate arrangement which in combination with the echo pulse controls a pulse adding and pulse cancelling arrangement. The contents of the counter for an opening and a closing target are changed by varying the number of counter pulses of the pulse train passed into the counter during each synchronizing period to shift the time of occurrence of the overflow count. Thus this invention has disclosed an improved arrangement for controlling the contents of a digital counter to indicate range of a moving target by varying the counter pulses passed into the counter in relation to a counter cycle.

What is claimed is:.

1. A circuit to which a random pulse and a synchronizing pulse are supplied to develop an output pulse substantitlly following the random pulse in time comprising: pulse generating means responding to said synchronizing pulse to develop a train of pulses, a recycling counter coupled to said pulse generating means and counting in response to said train of pulses, said counter forming an output pulse at a predetermined count; gating means coupled to said counter to respond to said output pulse and to said random pulse to apply a signal to an output terminal, first storage means coupled between the output terminal of said gating means and said pulse generating means to add pulses to said train of pulses, and second storage means connected between the output terminal of said gating means and said pulse generating means to subtract pulses from said train of pulses, the time of occurrence of said oput pulse indicating the time of occurrence of said random pulse.

2. A circuit to which a random and a synchronizing pulse are supplied comprising: a recycling counter to form an overflow pulse at a selected count; pulsing means coupled to said counter to develop a train of pulses to cause said counter to count in response to said synchronizing pulse, gating means coupled to said pulsing means to respond to said overflow pulse and responding to said random pulse, and first and second storage means coupled between said gating means and said pulse forming means to control said pulsing means, thus controlling the time of occurrence of said overflow pulse.

3. A circuit to which an activating signal is supplied comprising: a counter having an input to receive pulses to control counting and having an output on which an output signal is formed at a predetermined count; range gating means including a first signal forming means and a second signal forming means having outputs on which signals are formed in response to said activating signal and said output signal; pulse generating means to provide trains of pulses, said means connected to pass said train of pulses to the input of said counter; means connected to the input of said counter and responsive to said first signal forming means to add pulses to said trains of pulses; and means connected between said pulse generator and input of said counter and responsive to said second pulse forming means to cancel pulses from said trains of pulses.

4. A circuit to which an activating signal is supplied comprising: a counter having an input to receive pulses to control counting and having an output on which an output signal is formed at a predetermined count; range gating means including an early gate and a late gate having outputs on which signals are formed in response to said activating signal and said output signal; pulse generating means to provide trains of pulses, said means connected to pass said train of pulses to the input of said counter; means connected to the input of said counter and responsive to said early gate to add pulses to said trains of pulses; and means connected between said pulse generator and the input of said counter and responsive to said late gate to cancel pulses from said trains of pulses.

5. A circuit for providing an output indicative of the time relation of one signal to another comprising: a source of a first signal; a counter to form a second signal at a predetermined count; first pulse forming means connected to form pulses during fixed intervals to pass into said counter to cause said counter to count; gating means connected to said counter to form a third signal in response to a coincidence of said first signal and said second signal, and to form a fourth signal in response to said first signal and said second signal after a time delay; a first storage means connected to said gating means to receive said third signal; second storage means connected to said gating means to receive said fourth signal; cancelling means connected to said first pulse forming means to cancel a selected number of pulses passed from said first pulse forming means to said counter, in response to said fourth signal from said second storage; and second pulse forming means connected to said first storage to add a selected number of pulses to said pulses from said first pulse forming means in response to said third signal, said pulses from said second pulse forming means also causing said counter to count.

6. A circuit for providing an output indicative of the time relation of one signal to another comprising: a source of a first signal; a counter to form a second signal at a predetermined count; first pulse forming means connected to form pulses during fixed intervals to pass into said counter to cause said counter to count; gating means connected to said counter to form a third signal in response to a coincidence of said first signal and said second signal, and to form a fourth signal in response to said first signal and said second signal after a time delay; a first storage means connected to said gating means to receive said third signal; second storage means connected to said gating means to receive said fourth signal; cancelling means connected to said first pulse forming means to cancel pulses passed from said first pulse forming means to said counter, in response to said fourth signal from said second storage; and second pulse forming means connected to said first storage to add pulses to said pulses from said first pulse forming means in response to said third signal, said pulses from said second pulse forming means also causing said counter to count.

7. A time measuring circuit to which an activating signal is supplied during repetitive intervals comprising: a recycling counter having an input and having an output on which a signal is formed upon the occurrence of a predetermined count; means connected to said output of said counter to form a first signal in response to coincidences of said signal from said counter and said activating signal, and to form a signal in response to coincidences of said signal from said counter after a time delay and said activating signal, generating means to form a train of pulses during a first part of said repetitive intervals connected to the input of said counter, said counter counting sequentially in response to said pulses; a first means connected to the output of said pulse generating means to cancel pulses of said pulse train before passing to said counter, said first means being controlled by said second signal; and a second means connected to said counter to add pulses to said pulse train before passing to said counter, said second means being controlled by said first signal, whereby the time of occurrence of said signal out of said counter is determined by cancelling and adding pulses to said pulse train.

8. A range tracking circuit for providing an output indicative of the time relation between a first and second signal comprising: a source of first signals; a source of second signals, said signals defining periods; a recycling counter having an input and having an output on which an output signal is formed at a predetermined count; gating means connected to the output of said counter to form an early gate signal and late gate signal in response to said output from said counter and said first signal; a pulse generator connected to the input of said counter to form a train of pulses during a portion of each period in response to said second signal and passing said pulses to said counter to cause said counter to count; a delay line connected to said source of second signals to control said pulse train so as to provide pulses equal to the cycle count of said counter within the time between occurrence of said second signals; means connected to the input of said counter to add one pulse to the end of said pulse train in response to said early gate signal and means connected to the input of said counter to cancel one pulse from the beginning of said pulse train when passed through said means, in response to said late gate signal, whereby the presence of early gate and late gate signals in a first period determine the time of occurrence of said output signal in a second period.

9. A digital range tracking circuit receiving an echo signal during synchronous pulse periods comprising: a source of synchronous pulses; a first storage; a second storage; early and late gating means connected to receive said echo signal and connected to pass signals to said first and second storage respectively; a recycling counter having an input and having an output to pass a signal to said gating means upon the occurrence of a fixed count, to be compared with said echo signal; pulse forming means connected to the input of said counter to form, during a first part of said synchronous pulse period, a pulse train of a fixed number of pulses to cause said counter to count; said pulses equal in number to the total count cycle of said counter; means connected to said pulse forming means to cancel the first pulse of said pulse train in response to a signal received and stored from said second storage, said means including storage means; delay means connected to said source of synchronous pulses to delay said pulses, and connected to activate said first storage to pass a pulse to said counter to cause said counter to count after the occurrence of said pulse train, and to activate said second storage to pass a stored signal to said means to cancel the first pulse of the next pulse train after the occurrence of said pulse train, whereby the signals from said early and late gate means control the contents of said counter.

10. A digital range tracking circuit for tracking a target in response to an echo pulse received in periods as defined by synchronizing pulses comprising: a source of synchronizing pulses; a pulse generator responsive to said synchronizing pulses to form first and second pulse trains in first and second periods; a recycling counter connected to said pulse generator to count in response to said first and second train of pulses; a first delay means connected to said source of synchronizing pulses to stop said first and second pulse trains from said pulse generator after predetermined numbers of pulses equal to the counts of a cycle of said counter; pulse cancelling means including storage means connected between said pulse generator and said counter for cancelling the first pulses of said first and scond pulse trains; gating means connected to respond to a predetermined count of said counter and said echo pulse to form early gate signals and late gate signals; a first flip-flop connected to be triggered by said early gate signal; a second flip-flop connected to be triggered by said late gate signal; a second delay means connected to the output of said first delay means to trigger said first and said second flip-flops to form first and second output pulses at the end of said first pulse trains; said first flip-flop being connected to said counter to add said first output pulse to said first pulse train when triggered by the output of said second delay means; and said second flip-flop being connected to pass said second output pulse to be stored in said pulse cancellation circuit in response to said late gate signals, when triggered by the output of said second delay means, for cancelling the first pulse of said second pulse train.

11. A range tracking circuit for tracking a target in response to echo pulses comprising: a source of synchronizing pulses to define interpulse periods, pulse generator means connected to said source of synchronizing pulses to form trains of pulses within said interpulse periods; a recycling counter responding to pulses from said pulse generator with its output count indicating range, said counter forming an overflow pulse at an output in response to a predetermined count; gating means having late gate and early gate outputs connected to respond to coincidences of an echo pulse and said overflow pulse to form late gate pulses and early gate pulses; said gating means forming both late gate pulses and early gate pulse when said counter is on target; a pulse cancellation circuit connected between said pulse generator means and the input to said counter to cancel the first pulse of said train of pulses; a first flip-flop having an input and an output with its input connected to said late gate output to store the late gate pulse and with its output connected to said pulse cancellaion circuit to pass an output pulse to cancel the first pulse of one of said train of pulses; a second flip-flop having an input and output, with its input connected to said early gate output to store said early gate pulse and its output connected to said counter to pass an output pulse to be added to one of said train of pulses; delay means to delay said synchronizing pulses and connected to reset said first and second flip-flop to form said output pulses after each of said pulse trains have been formed, whereby the pulses passed into said counter during each interpulse period control said counter for indicating target range.

12. A digital range tracking circuit for tracking a target in response to an echo signal received during a fixed period comprising: a pulse generator to form a train of pulses during a first portion of said fixed period; a recycling counter comprised of flip-flops to count binarily forward in a sequential manner in response to said train of pulses and having a total count equal to the number of pulses of said train of pulses; said counter having an input to control its first binary to count once in reponse to each of said input pulses; said counter having an output to carry an output signal at a predetermined count; gating means connected to form early gate signals when said output signals coincide in time with said echo signals and to form late gate signals when said output signals after a time delay coincide in time with said echo signals; a first storage connected to respond to said early gate; a second storage connected to respond to said late gate signals; a pulse cancellation circuit connected to the output of said pulse generator to cancel the first pulse of said pulse trains in response to a pulse from said second storage. means connected to said first storage to pass a pulse to said counter at the end of said pulse train; means connected to said second storage to pass a pulse to said pulse cancelling circuit at the end of said pulse train; and means connected to said first and second storage to manually cause them to pass pulses, whereby said early gate signals cause an additional pulse to be added to the end of said pulse train and said late gate signals cause the first pulse of the pulse train of the next fixed period to be prevented from passing into said counter.

13. A digital range tracking circuit for tracking a target in response to echo signals and synchronizing pulses defining a transmitter interpulse period comprising: a source of synchronizing pulses; a recycling counter to give an overflow signal at a predetermined count and having digital outputs of the count value to indicate range; a pulse generator connected to pass a train of pulses to said counter in response to said synchronizing pulses, each pulse causing the counter to count once; a range gate connected to said counter to form a signal in response to said overflow signal from said counter; early gate means connected to said range gate to form early gate signals in response to a coincidence of signals from said range gate and said echo signal; late gate means connected to said range gate to form late gate signals in response to a coincidence of signals from said range gate after a time delay of one pulse period and said echo signal; a first delay line connected to said source of synchronizing pulses to form a first delayed signal in response to said synchronizing pulse and connected to control said pulse generator to form said train of pulses equal to the total count capacity of said counter; a first flip-flop having an input connected to said early gate to store said early gate signal; a second flip-flop having an input connected to said late gate to store said late gate signal; a pulse cancellation circuit including a storage connected to said second flip-flop to receive said late gate signal from said second flip-flop to cancel the next pulse passed through said circuit; a second delay line connected to the output of said first delay line to delay said first delayed signal and form a second delay signal, said second delay signal connected to trigger said first and said second flip-flops when storing an early and late gate signal respectively; differentiating means connected to said first flip-flop to form a pulse to pass to said counter after said pulse train is formed; and means connected to said second flip-flop to form a signal to pass to said pulse cancellation circuit after said pulse train is formed, whereby said early gate signal during a first interpulse period adds a pulse to said pulse train to increase said starting count during a second interpulse period and said late gate signal cancels the first pulse in said second interpulse period to delay said counting.

References Cited in the file of this patent
UNITED STATES PATENTS

| | | |
|---|---|---|
| 2,418,521 | Morton | Apr. 8, 1947 |
| 2,482,932 | Pyatt | Sept. 27, 1949 |
| 2,539,623 | Heising | Jan. 30, 1951 |
| 2,700,750 | Dickinson | Jan. 25, 1955 |
| 2,715,678 | Barney | Aug. 16, 1955 |
| 2,717,994 | Dickenson | Sept. 13, 1955 |